July 15, 1958 S. HOLDENER 2,842,982
MOVEMENT TRANSMISSION
Filed Aug. 9, 1955
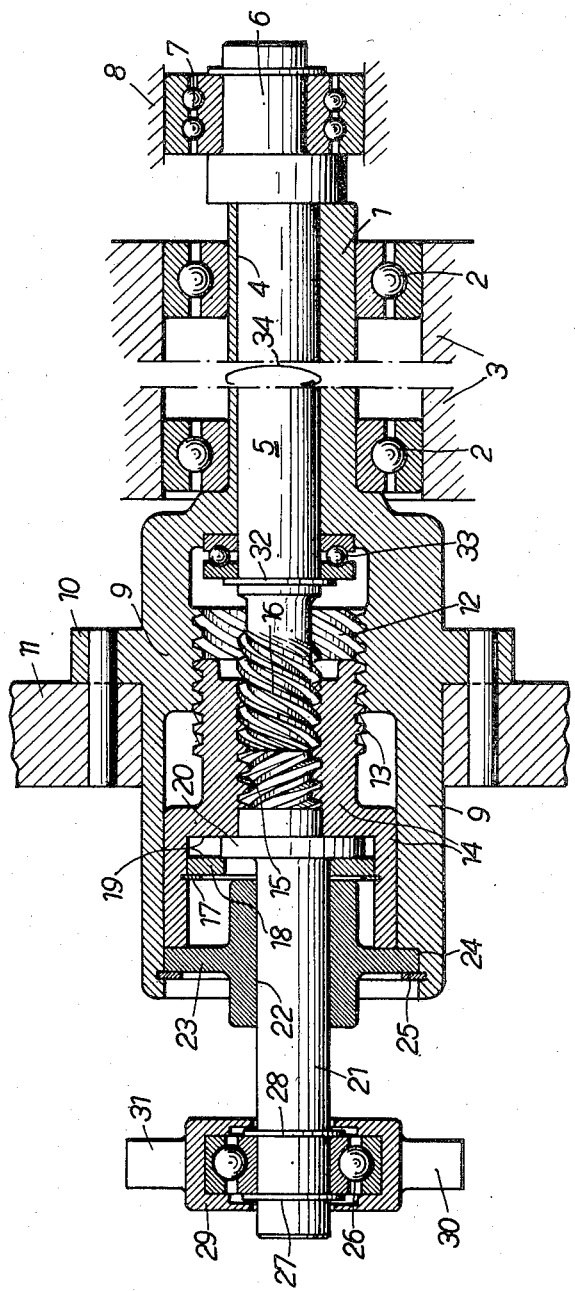
INVENTOR:
SIMEON HOLDENER
By Bates, Teare, & McBean

United States Patent Office 2,842,982
Patented July 15, 1958

2,842,982

MOVEMENT TRANSMISSION

Simeon Holdener, Wolfhausen, Zurich, Switzerland

Application August 9, 1955, Serial No. 527,311

Claims priority, application Switzerland August 28, 1954

3 Claims. (Cl. 74—600)

The present invention relates to a movement transmission having a device for adjusting the stroke of a crank shaft with respect to a main shaft rotating therewith, whereby the crank shaft is arranged in an eccentrical boring of the main shaft.

According to the invention there is provided a displaceable member engaging the crank shaft and the main shaft in such a way that by axial displacement of said member the crank shaft and the main shaft are rotationally adjustable relatively to each other during rotation, in order to vary the stroke of the crank shaft.

When for example the crank pin serves to drive a pump the output of the latter may be selectively and steplessly varied between zero and a maximum, whereby a greater pressure may be produced at decreasing stroke. Similarly for other uses of such crank shafts the two factors force and distance may be varied. The device is of a very simple and strong construction, is easy to manufacture with usual machines and is very reliable in operation.

Other features and advantages of the invention will become apparent from the description now to follow of a preferred embodiment thereof, given by way of example and in which reference will be made to the accompanying drawings showing a longitudinal section through a device according to the invention.

In the drawings reference numeral 1 designates a main shaft rotatably mounted by means of two ball bearings 2 in a housing 3. The crank shaft 5 is arranged in a boring 4 of the main shaft 1, said boring 4 being eccentrical with respect to the axis of rotation. At the right hand end of the crank shaft 5 there is provided the crank pin 6, which has the same eccentricity with respect to the axis of the crank shaft as has the boring 4 with respect to the axis of rotation of main shaft 1. The part 8 to be driven, e. g. a main rod or any other rod is arranged on the crank pin 6 by means of a ball bearing 7.

The left-hand end of main shaft 1 is constituted as a cylindrical head portion 9 comprising an outer flange 10 serving to connect a chain wheel 11 for driving the main shaft 1. Into a boring of this head portion 9, centered with respect to the boring 4 of main shaft 1, there is worked a right-handed steep inner thread 12 cooperating with an outer thread 13 on a member 14 displaceably guided in the head portion 9. This member 14 further comprises a left-handed steep inner thread 15 cooperating with a steep outer thread 16 formed at the left end of crank shaft 5. In the member 14 there is formed, by means of an insert ring 18 held in place by a split ring 17, an annular groove 19 engaged by an annular flange 20 of a displaceable bolt 21 supported in a boring 22, centered with respect to the axis of rotation of main shaft 1, of a bearing bush 23. This bush 23 is secured by a split ring 25 in a recess 24 of head portion 9, said recess 24 being also centered with respect to the axis of rotation of main shaft 1.

Two split rings 27, 28 secure against displacement a ball bearing 26 at the left-hand end of the bolt 21. The outer ring of ball bearing 26 is inserted in a housing 29 carrying two pins 30, 31 serving to receive a not represented fork. Between the main shaft 1 and a split ring 32 secured on the crank shaft 5 there is arranged an axial thrust ball bearing 33 taking up the counter-pressure exerted by the threads.

The described device operates as follows:

In the position of the parts as illustrated in the drawing, the crank pin 6 executes upon rotation of the main shaft 1 and crank shaft 5 the highest stroke. If now by means of the not represented fork the bolt 21 is displaced to the right out of the represented position, it entrains the member 14. Thereby, by cooperation of the right-handed outer thread 13 of member 14 with the inner thread 12 of head portion 9 of main shaft 1 the member 14 is rotated with respect to main shaft 1 in the direction indicated by arrow 34. Simultaneously by the cooperation of the left-handed inner thread 15 of member 14 with the outer thread 16 of crank shaft 5, the latter is also rotated relatively to member 14 in direction of arrow 34. Crank shaft 5 thus is rotated with respect to main shaft 1 about the sum of the two partial rotations. Thereby the stroke of the crank pin 6 decreases in accordance with this relative rotation. Upon a rotation of 180° between the crank shaft 5 and main shaft 1 the crank pin 6 will be centered with respect to the axis of main shaft 1 and effect no stroke. Thus by displacing the bolt 21 it is possible to vary the stroke of a crank pin steplessly between zero and the illustrated maximum.

I claim:

1. An adjustable crank mechanism comprising, a continuously rotatable main shaft having an open-ended eccentric bore with an enlarged portion at one end thereof having steep threads formed on at least a portion of the longitudinal wall thereof, means for continuously rotating said main shaft, a crank shaft rotatably mounted in said bore and having an eccentric crank pin on its outer end and having a steep threaded inner end disposed in said enlarged portion of the bore, the eccentricity of said crank pin relative to said crank shaft being the same as the eccentricity of the bore relative to the axis of rotation of the main shaft, an axially shiftable hollow member mounted in said enlarged portion of the bore and including a portion disposed between the threaded inner end of the crank shaft and the main shaft and having steep outer threads formed on the exterior longitudinal surface thereof for coactingly engaging the threads on the enlarged portion of the main shaft bore and having steep inner threads formed on the interior longitudinal surface thereof for coactingly engaging the threads on the inner end of the crank shaft, and means for axially shifting said hollow member, whereby actuation of said means changes the eccentric relation of the crank pin relative to the axis of rotation of the main shaft.

2. An adjustable crank mechanism comprising, a continuously rotatable main shaft having an open-ended eccentric bore with an enlarged portion at one end thereof having steep threads formed on at least a portion of the longitudinal wall thereof, means for continuously rotating said main shaft, a crank shaft rotatably mounted in said bore and having an eccentric crank pin on its outer end and having a steep threaded inner end disposed in said enlarged portion of the bore, the eccentricity of said crank pin relative to said crank shaft being the same as the eccentricity of the bore relative to the axis of rotation of the main shaft, an axially shiftable hollow member mounted in said enlarged portion of the bore and including a portion disposed between the threaded inner end of the crank shaft and the main shaft and having steep outer threads formed on the interior longitudinal surface thereof for coactingly engaging the threads on the enlarged portion of the main shaft bore and having steep inner threads formed on the interior longitudinal surface thereof for coactingly engaging the threads on the inner end of the crank shaft, and a rod concentrically journaled in and axially movable in said main shaft and having its outer end extending to the exterior of the main shaft and having its inner end connected with said hollow member for axial movement therewith whereby axial movement of the rod changes the eccentric relation of the crank pin relative to the axis of rotation of the main shaft.

3. An adjustable crank mechanism constructed in accordance with claim 2 wherein the connection between said rod and said hollow member includes an internally facing annular groove formed in the hollow member and an annular flange formed on the inner end of said rod and seating in said groove, the internal diameter of the base of said groove being greater than the external diameter of said flange whereby said rod may rotate concentric with said main shaft.

References Cited in the file of this patent

UNITED STATES PATENTS

| | | |
|---|---|---|
| 1,630,168 | Caut | May 24, 1927 |
| 1,946,309 | Coffman | Feb. 6, 1934 |
| 2,188,060 | Robins | Jan. 23, 1940 |
| 2,338,352 | Paque | Jan. 4, 1944 |
| 2,455,842 | Weigel | Dec. 7, 1948 |